Inventor
HENRY E. MERRITT
By Mason, Fenwick & Lawrence
Attorneys

United States Patent Office 3,430,523
Patented Mar. 4, 1969

3,430,523
GYRATORY GEARING
Henry E. Merritt, Claverdon, England, assignor to Merritt & Company (Engineering) Limited, Claverdon, England, a British company
Filed Sept. 20, 1967, Ser. No. 669,198
U.S. Cl. 74—805         9 Claims
Int. Cl. F16h 1/28

ABSTRACT OF THE DISCLOSURE

A motorised ground-wheel is driven through reduction gearing of the gyratory type in which an internally toothed annular gear secured to the wheel is driven by a pair of mutually angularly displaced planet gears each of which is mounted eccentrically with respect to the annular gear. The planet gears are driven by eccentrics rotatable about the axis of the annular gear and are constrained to gyrate by means of improved guide pin and roller assemblies which pass through circular apertures in the planet wheels.

---

This invention relates to gyratory gearing, and relates especially but not exclusively to motorised ground wheels such, for example, as are used to drive load handling machines and industrial load lifting trucks having load carriers movable on upright guides for supporting loads during transit.

A motorised ground wheel is usually constructed as a self-contained driving unit incorporating a rotary motor, which is usually electric but could be hydraulic, and reduction gearing between the motor and the wheel rim which usually has a type thereon.

Gyratory gearing is desirable in a motorised ground wheel of the type stated because of the high reduction ratio obtainable in compact form to cope with the speed difference between the relatively high speed motor and the relatively low speed required at the wheel rim.

In gyratory gearing, a planet wheel, driven by a rotatable eccentric, is constrained to gyrate in a circular manner without angular movement relative to its axis by means of rollers which pass through circular apertures in the planet wheel, the apertures being of greater diameter than the rollers by twice the eccentricity of the eccentric.

It has been found, using this arrangement, that disadvantages arise due to inaccuracies and wear related to each roller and aperture, resulting in a non-gyratory motion of the planet wheel, and a consequential drop in the efficiency of the gearing.

An object of the present invention is to provide a roller and aperture arrangement whereby these disadvantages are obviated or mitigated.

According to the present invention there is provided gyratory gearing including an internally toothed annulus in mesh with an externally toothed planet wheel bearingly supported on a rotatable eccentric, at least two circular apertures in said planet wheel equi-angularly disposed about the axis thereof and having their axes parallel to the axis of said planet wheel, a tubular roller in each aperture, eccentrically disposed relative thereto and engaging the wall thereof, and shaft means eccentrically disposed in each tubular roller and engaging the internal wall thereof, the eccentricity of each tubular roller in its associated aperture plus the eccentricity of each shaft means in its associated tubular roller being equal to the eccentricity of said eccentric.

Further, according to the present invention there is provided a motorised ground wheel including gyratory gearing according to the present invention.

An embodiment of the invention will now be described, by way of example, with reference to the accompanying drawings, in which.

Figure 1:
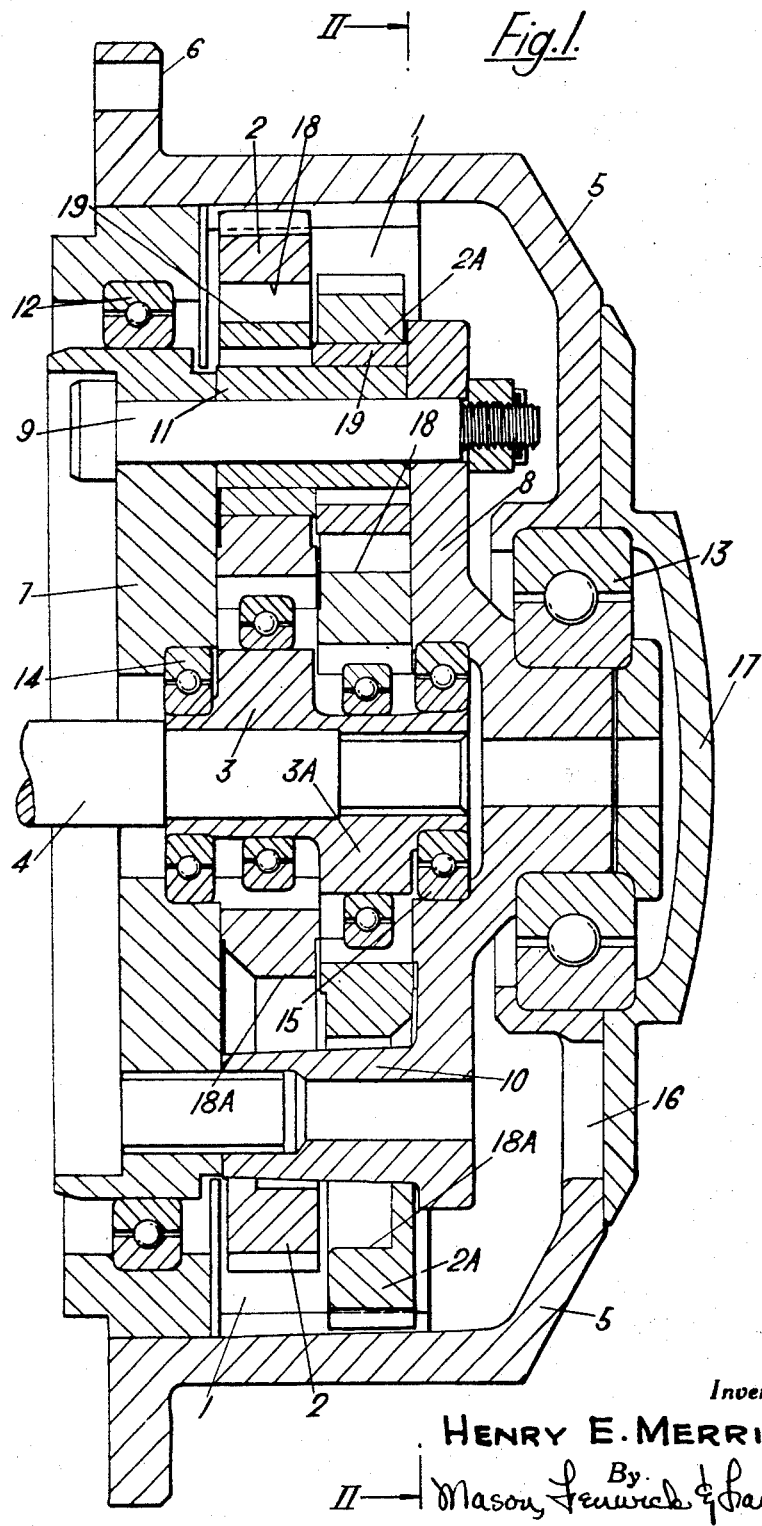
FIG. 1 is a sectional elevation of gyratory gearing for a motorised ground wheel drawn on the line I—I of FIG. 2.

In the drawings, gyratory gearing according to the present invention is embodied in the reduction gear of a motorised ground wheel and consists, generally, of an internally toothed annulus 1 in mesh with two externally toothed planet wheels 2 and 2A journalled on two rotatable eccentrics 3 and 3A respectively.

The eccentrics 3 and 3A are formed integrally and are adapted to be coupled to the shaft 4 of an electric motor (not shown). The annulus 1 is formed on the internal cylindrical wall of a flanged, dished cover plate 5, the flange 6 of which is adapted to be secured to a ground wheel (not shown). The complete assembly of electric motor, reduction gearing and ground wheel is usually mounted on a vehicle and may be swivelled about a king-pin for steering purposes in known manner.

The reduction gearing is supported on a carrier assembly consisting of spaced parallel members 7 and 8, which are clamped together by means of four pins 9 and spaced apart by means of legs 10 and also sleeves 11, the latter being located on the pins 9. The legs 10 are formed integrally with the member 8. The carrier assembly is secured to the motor (not shown) by means of bolts (not shown) passing through the legs 10. The cover plate 5 is supported on the carrier assembly by bearings 12 and 13 on the members 7 and 8 respectively and the eccentrics 3 and 3A are supported by bearings 14 and 15 on the members 7 and 8 respectively. Access to the bolts for securing the carrier assembly to the motor is through an aperture 16 in the cover plate 5, the aperture 16 being covered by a detachable plate 17 secured to the cover plate 5.

The two planet wheels 2 and 2A are driven by the eccentrics 3 and 3A respectively, and are constrained to gyrate, that is to move with a circular motion without angular motion about their own axes, by means of circular apertures 18 formed in the planet wheels 2 and 2A and through which the pins 9 and the sleeves 11 pass. Additional apertures 18A are formed in the planet wheels 2 and 2A to permit their freedom of movement relative to the legs 10 of the carrier assembly.

Figure 2:
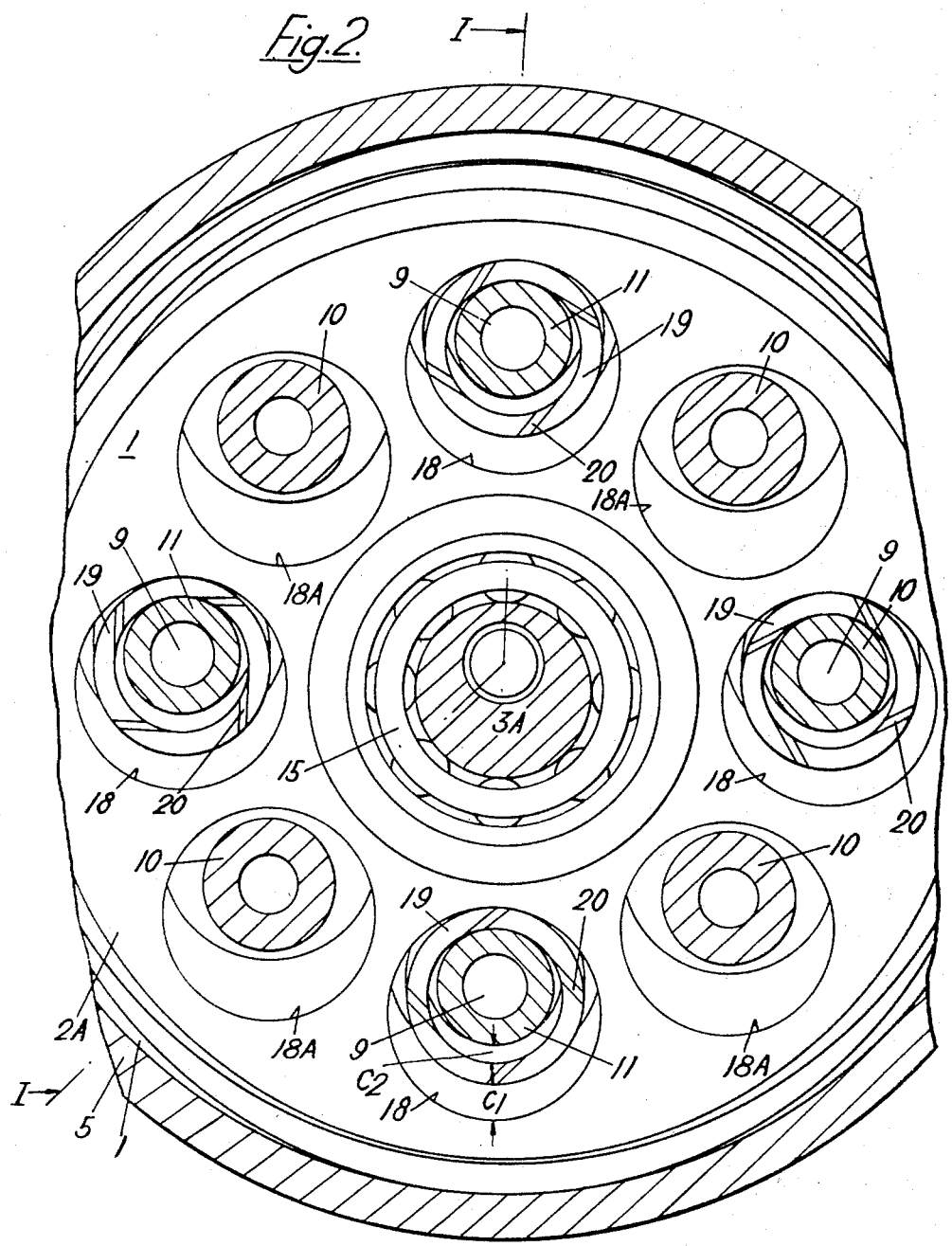
FIG. 2 is a corresponding sectional end view drawn on the line II—II in FIG. 1.
Figure 3:
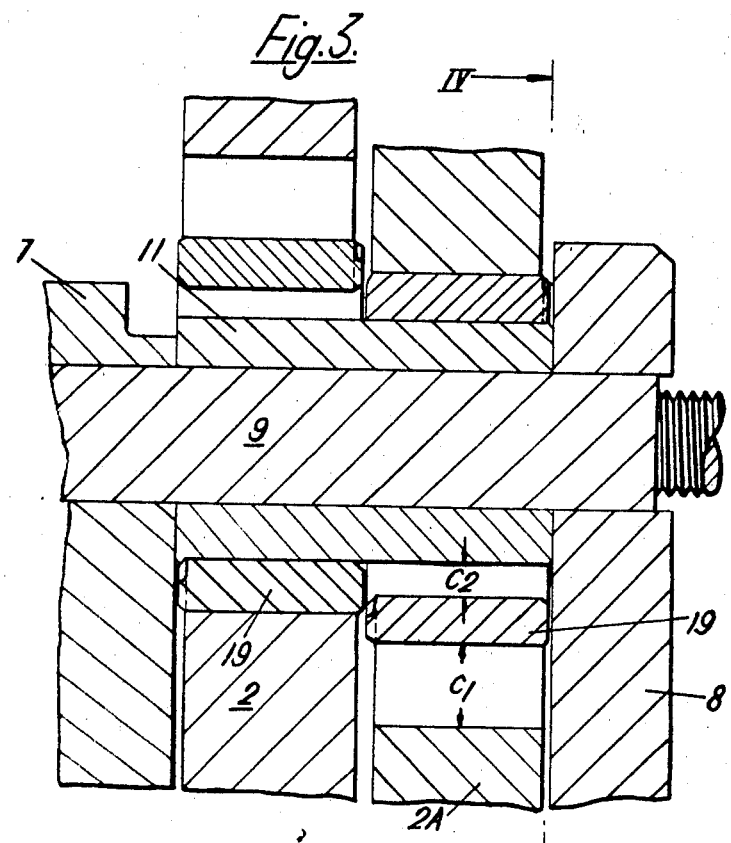
FIG. 3 is a sectional elevation of a detail of FIG. 1 to a larger scale.

The mode of operation of each planet wheel is identical, and the following description of the constraint effected by each aperture 18 and each pin 9 is confined to the planet wheel 2A in order that reference may conveniently be made to the sectional view of FIG. 2.

In FIG. 2, it may be seen that each pin 9 and sleeve 11 is eccentrically disposed relative to each aperture 18 and that there are tubular rollers 19 on each sleeve 11 and engaging both the wall of each aperture 18 and the outer surface of each sleeve 11. The tubular rollers 19 are disposed eccentrically in the aperture 18 and on the sleeves 11 and the relevant dimensions are such that the maximum clearances between aperture and roller and roller and sleeve (indicated by $C_1$ and $C_2$) when added together equal twice the eccentricity of the eccentric 3A. The pins 9 and sleeves 11 constitute shaft means eccentrically disposed in the apertures 18 and constrain the planet wheel 2A to gyrate when driven by rotation of the eccentric 3A. Thus, it may be simply calculated that the eccentricity of each tubular roller in its associated aperture plus the eccentricity of each shaft means in its associated tubular roller being equal to the eccentricity of said eccentric.

The effect of one complete circular movement of the planet wheel 2A (i.e. one gyration) is to drive the annulus 1 about its axis by an amount corresponding to the difference between the number of teeth on the annulus 1 and the number of teeth on the planet wheel 2A.

As aforesaid, there are two similar planet wheels 2 and 2A which engage the annulus 1 there being separate rollers 19, for the planet wheel 2. The eccentric 3 is set at 180° to the eccentric 3A and accordingly, the meshing between the planet wheel 2 and the annulus 1 will be diametrically opposite to the meshing between the planet wheel 2A and the annulus 1. That is to say, the reduction gearing is constituted by two planet wheels arranged 180° apart and each acting on the same annulus through pairs of inter-meshing teeth.

Because the tubular rollers 19 are mounted on the sleeves 11 with a substantial clearance, in each case, the tubular rollers 19 and sleeves 11 make "line contact." The tubular rollers 19 roll without slip in the aperture 18 because the frictional forces at the points of contact between the rollers and apertures act at a greater radial distance than the forces between the rollers and sleeves. Moreover, as the angular positions of the eccentrics 3 the 3A change, the orientation of the rollers 19 relative to the sleeves 11 changes in the same way. As a result of the rolling of each tubular roller 19 in each aperture 18, the tubular rollers 19 slide on the sleeves 11 and the sliding velocity being less than the velocity of the line of contact between the tubular rollers 19 and sleeves 11, the lubricant is rolled in towards the line of contact and builds up a protective film of lubricant between the tubular rollers 19 and sleeves 11.

It will be apparent that there may be any practicable number of juxtaposed planet wheels, arranged in appropriate equi-spaced angular relationship and all meshing with a single annulus 1 and constrained by a set of tubular rollers 19 for each planet wheel, and sleeves 11 being common to the planet wheels.

It is desirable in practice to provide at least two planet wheels to minimise out-of-balance forces. By so doing, one can attain the advantage that the radial forces on the input shaft 4 and the annulus 1 are balanced, and so also are the radial loads due to centrifugal forces on the planet wheels. The resultant out-of-balance effect is reduced to a rocking couple which is, however, of small magnitude because of the closely juxtaposed planet wheels.

A further advantage is that a high gear ratio, combined with high efficiency is obtained, thus enabling the driving motor to be kept small. In addition, when the power output from the motor is cut off in order to stop or reverse the driven ground wheel, the high efficiency prevents a condition of irreversibility which could cause damage to the gearing.

The invention provides a combination of compactness, simplicity, rigidity and high efficiency.

Figure 4:
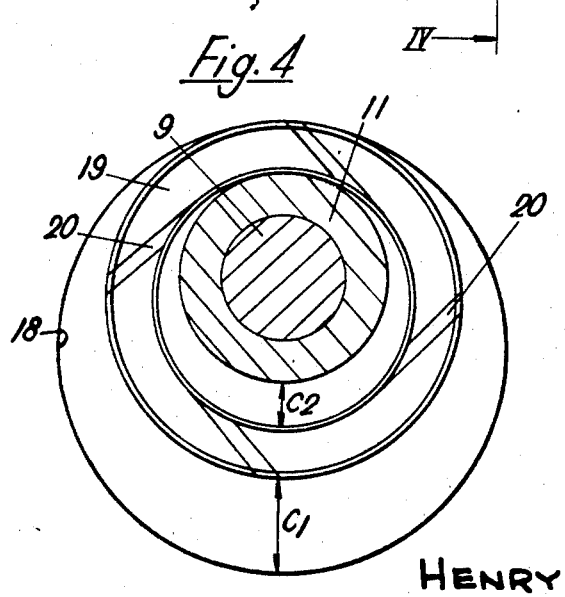
FIG. 4 is a corresponding sectional end view drawn on the line IV—IV in FIG. 3.

An important refinement is shown in FIGS. 2 and 4 and that is the small tangential grooves 20 on the end faces of the tubular rollers 19. These grooves 20 act to trap and direct oil to the bore of each tubular roller 19.

A further advantage of the construction, deriving from the substantial clearance between the tubular rollers 19 and the sleeves 11 is that it is possible for the tubular rollers 19 to run in a direction slightly askew to the axis of each sleeve 11. It has been found that with close-fitting rollers, in earlier constructions, a small error in the alignment of any sleeve 11, or of a planet 2, 2A, due either to manufacturing errors or to distortion of the whole assembly under imposed loads, could cause a roller to be pressed against one of the fixed faces which locate it endwise, and produce an undesirable amount of wear.

With the construction described, a roller so acted upon aligns itself to the locating face and wear is very substantially reduced.

The rollers and sleeves are desirably made of hardened steel. This gives good resistance to abrasive wear, which might otherwise occur due to the presence of solid particles in the lubricant. Such particles cannot easily become embedded in the surfaces. The action described, it may be emphasized, is quite different from what would occur if the roller ran on the sleeve under a constant direction of load, as in an ordinary journal bearing. It will be appreciated that the invention may be used with any gyratory gearing, and need not be restricted to motorised wheels.

I claim:

1. Gyratory gearing including an internally toothed annulus in mesh with an externally toothed planet wheel bearingly supported on a rotatable eccentric, at least two circular apertures in said planet wheel equiangularly disposed about the axis thereof and having their axes parallel to the axis of said planet wheel, a tubular roller in each aperture and eccentrically disposed relative thereto and engaging the wall thereof, and shaft means eccentrically disposed in each tubular roller and engaging the internal wall thereof, the eccentricity of each tubular roller in its associated aperture plus the eccentricity of each shaft means in its associated tubular roller being equal to the eccentricity of said eccentric.

2. Gyratory gearing according to claim 1, in which said shaft means comprises a pin, having a sleeve thereon, said sleeve engaging the inner wall of said tubular roller.

3. Gyratory gearing according to claim 1, in which said tubular roller has at least one groove traversing an end face of the tubular roller for the passage of lubricant.

4. Gyratory gearing according to claim 3, in which said groove is disposed obliquely to a diameter of said tubular roller.

5. Gyratory gearing according to claim 1, in which there are provided two or more of said planet wheels, each planet wheel being mounted on its own eccentric and meshing with a common annulus, said planet wheels being equi-angularly disposed about the axis of rotation of the eccentrics.

6. Gyratory gearing according to claim 1, in which said annulus is rotatably mounted on a carrier which supports said shaft means.

7. Gyratory gearing according to claim 6, in which said carrier is secured to the casing of a motor so that said annulus is co-axial with an output shaft of the motor, said output shaft being drivingly connected to said eccentric to rotate same.

8. Gyratory gearing according to claim 7, in which said annulus is secured to the rim of a ground wheel.

9. Gyratory gearing according to claim 8, in which said motor is an electric motor.

References Cited

UNITED STATES PATENTS

| 449,900 | 4/1891 | Clemons | 74—805 |
| 1,770,035 | 7/1930 | Heap et al. | 74—805 |
| 1,870,875 | 8/1932 | Scheuer | 74—805 |
| 3,370,668 | 2/1968 | Goodacre | 74—804 X |

FOREIGN PATENTS

| 956,383 | 4/1964 | Great Britain. |

U.S. Cl. X.R.

180—75.

T. C. PERRY, *Assistant Examiner.*

ROBERT M. WALKER, *Primary Examiner.*